(12) United States Patent
Ye et al.

(10) Patent No.: US 12,550,912 B1
(45) Date of Patent: Feb. 17, 2026

(54) ICE CREAM MACHINE

(71) Applicant: Guangdong Willing Technology Corporation, Guangdong (CN)

(72) Inventors: Jingnong Ye, Guangdong (CN); Shuisheng Wen, Guangdong (CN); Chengbo Yu, Guangdong (CN)

(73) Assignee: Guangdong Willing Technology Corporation, Huizhou (CN)

( * ) Notice: Subject to any disclaimer, the term of this patent is extended or adjusted under 35 U.S.C. 154(b) by 0 days.

(21) Appl. No.: 19/090,461

(22) Filed: Mar. 26, 2025

(30) Foreign Application Priority Data

Jan. 24, 2025 (CN) .......................... 202520172641.9

(51) Int. Cl.
*A23G 9/26* (2006.01)
*A23G 9/08* (2006.01)
*A23G 9/22* (2006.01)

(52) U.S. Cl.
CPC ................. *A23G 9/26* (2013.01); *A23G 9/08* (2013.01); *A23G 9/228* (2013.01)

(58) Field of Classification Search
CPC . A23G 9/26; A23G 9/221; A23G 9/08; A23G 9/228; A23G 1/50; A23G 1/502; A23G 1/505; A23G 1/503; A23G 2220/10; A23G 2220/12
See application file for complete search history.

(56) References Cited

U.S. PATENT DOCUMENTS

| | | | |
|---|---|---|---|
| 8,430,658 B2 | 4/2013 | Zorovich et al. | |
| 10,925,431 B2 | 2/2021 | Contessa | |
| 2010/0183789 A1 | 7/2010 | Zorovich et al. | |
| 2013/0029019 A1 | 1/2013 | Pryor et al. | |
| 2016/0227814 A1 | 8/2016 | Arpino | |
| 2016/0278401 A1* | 9/2016 | Noth | A23G 9/08 |
| 2019/0339006 A1 | 11/2019 | Cronin et al. | |
| 2022/0248708 A1* | 8/2022 | Tondini | B65D 85/78 |
| 2025/0236504 A1* | 7/2025 | Lerman | A23G 9/228 |

* cited by examiner

*Primary Examiner* — Miguel A Diaz
(74) *Attorney, Agent, or Firm* — S.J. Intellectual Property Ltd.

(57) ABSTRACT

The present disclosure discloses an ice cream machine, including a housing. An outer frame is provided inside the housing, a sidewall of the housing defines a first opening, a sidewall of the outer frame defines a second opening. An inner frame is provided inside the outer frame, and the inner frame is removable from the outer frame from the second opening and the first opening. An evaporation pipe, a compressor, and a condenser are provided inside the housing, the evaporation pipe is wound around the outer frame, and the evaporation pipe is connected to the compressor and the condenser.

19 Claims, 8 Drawing Sheets

ICE CREAM MACHINE

CROSS REFERENCE TO RELATED APPLICATIONS

This application claims priority benefits to Chinese Patent Application No. 2025201726419, filed on Jan. 24, 2025, the contents of which are incorporated herein by reference.

TECHNICAL FIELD

The present disclosure relates to the technical field of ice cream devices, and in particular, to an ice cream machine.

BACKGROUND

The current ice cream machine can only produce a single style of ice cream, resulting in inconvenience for users.

SUMMARY

The present disclosure provides an ice cream machine, including a housing, an outer frame is disposed inside the housing, a sidewall of the housing is defined with a first opening, a sidewall of the outer frame is defined with a second opening, an inner frame is provided inside the outer frame, and the inner frame is detachable from the outer frame through the second opening and the first opening; an evaporation tube, a compressor, and a condenser are provided inside the housing, the evaporation tube is wound around the outer frame, and the evaporation tube is connected to the compressor and the condenser.

DETAILED WAY

The following description will be combined with the drawings to clearly and completely describe the technical solutions in the embodiments of the present disclosure, but it does not constitute a limitation on the protection scope of the present disclosure.

Figure 1:
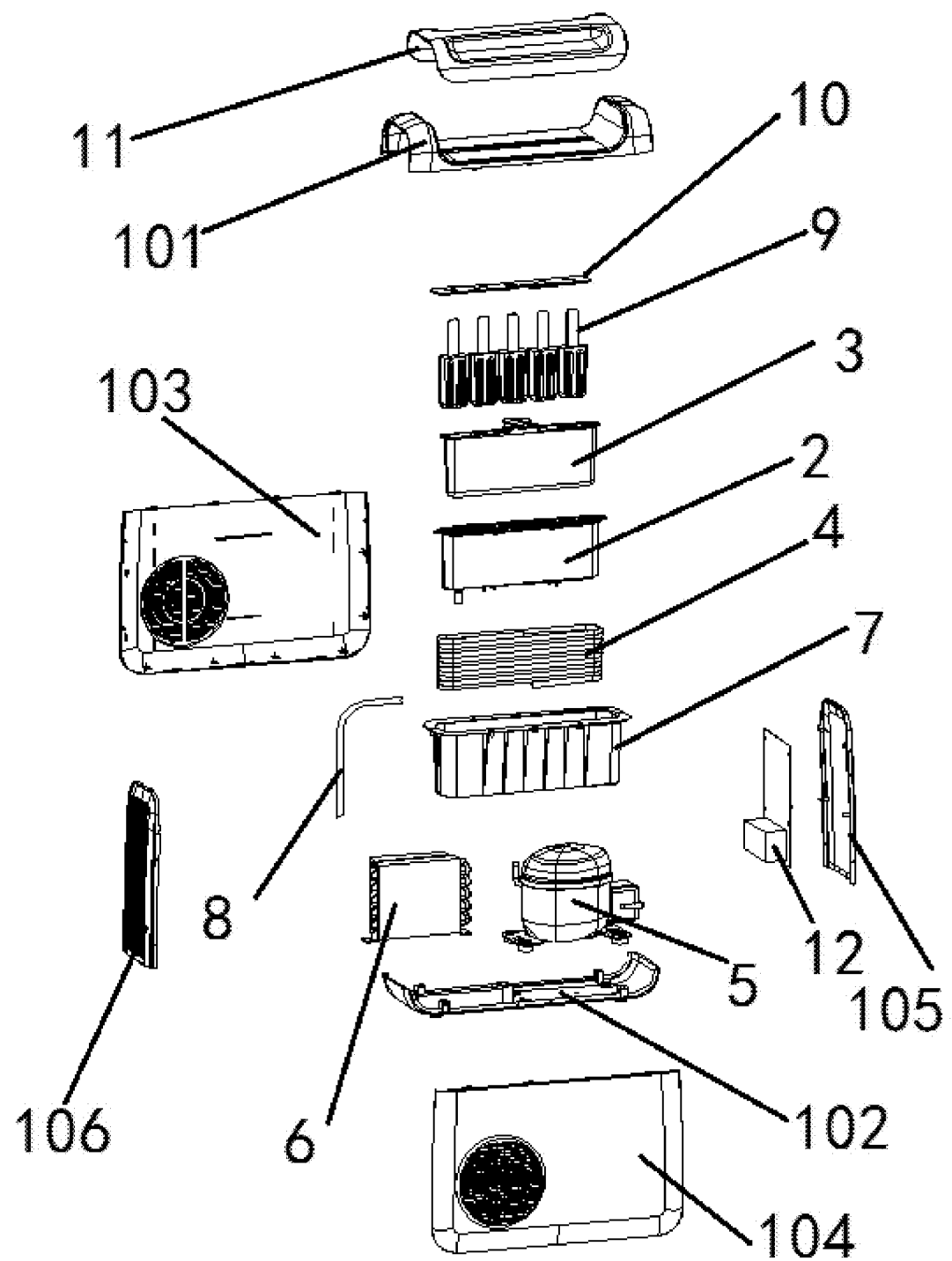
FIG. 1 is an exploded view of the present disclosure.
Figure 2:
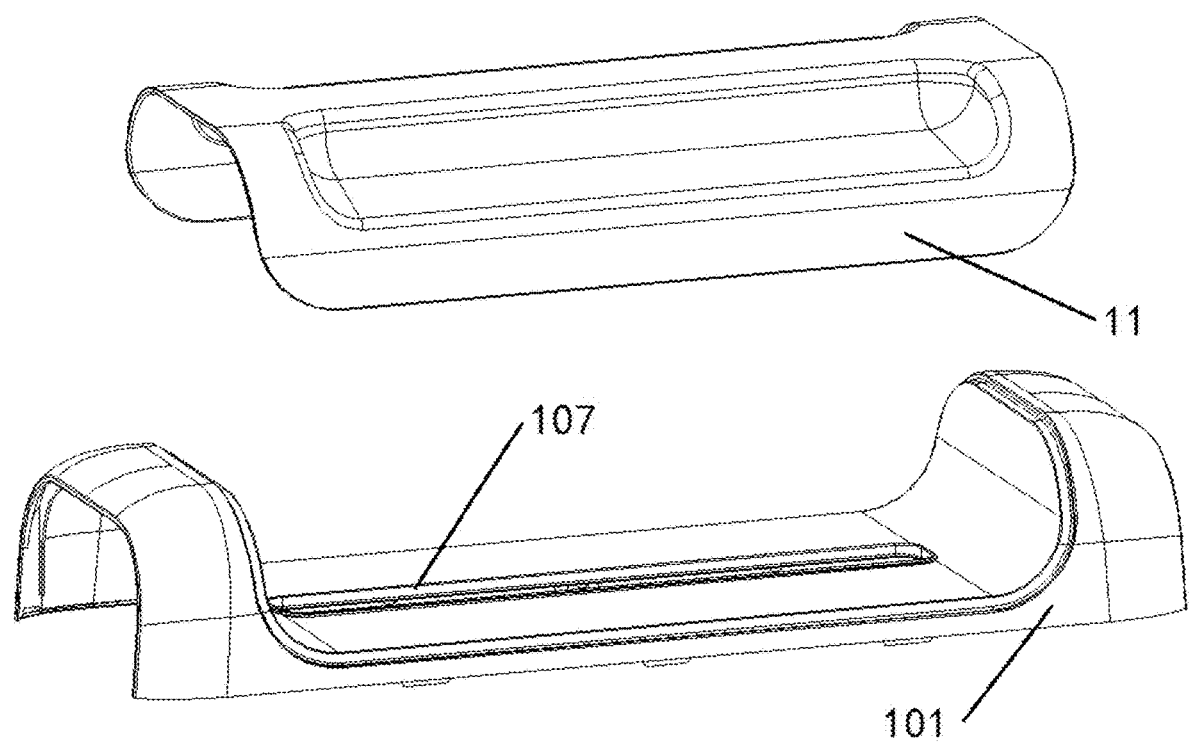
FIG. 2 is an enlarged view of an upper area of FIG. 1.
Figure 3:
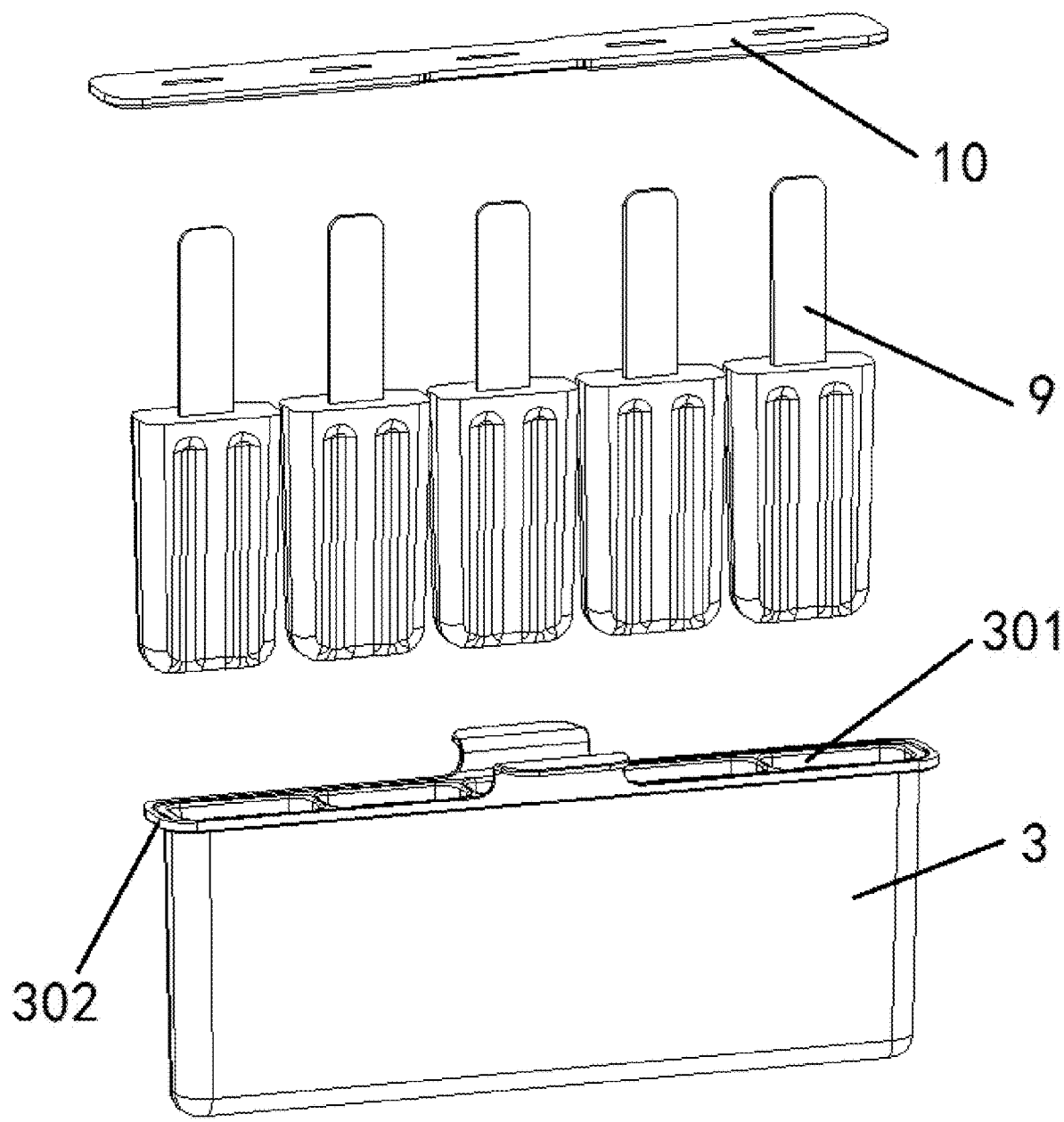
FIG. 3 is an enlarged view of a middle upper area of FIG. 1.
Figure 4:
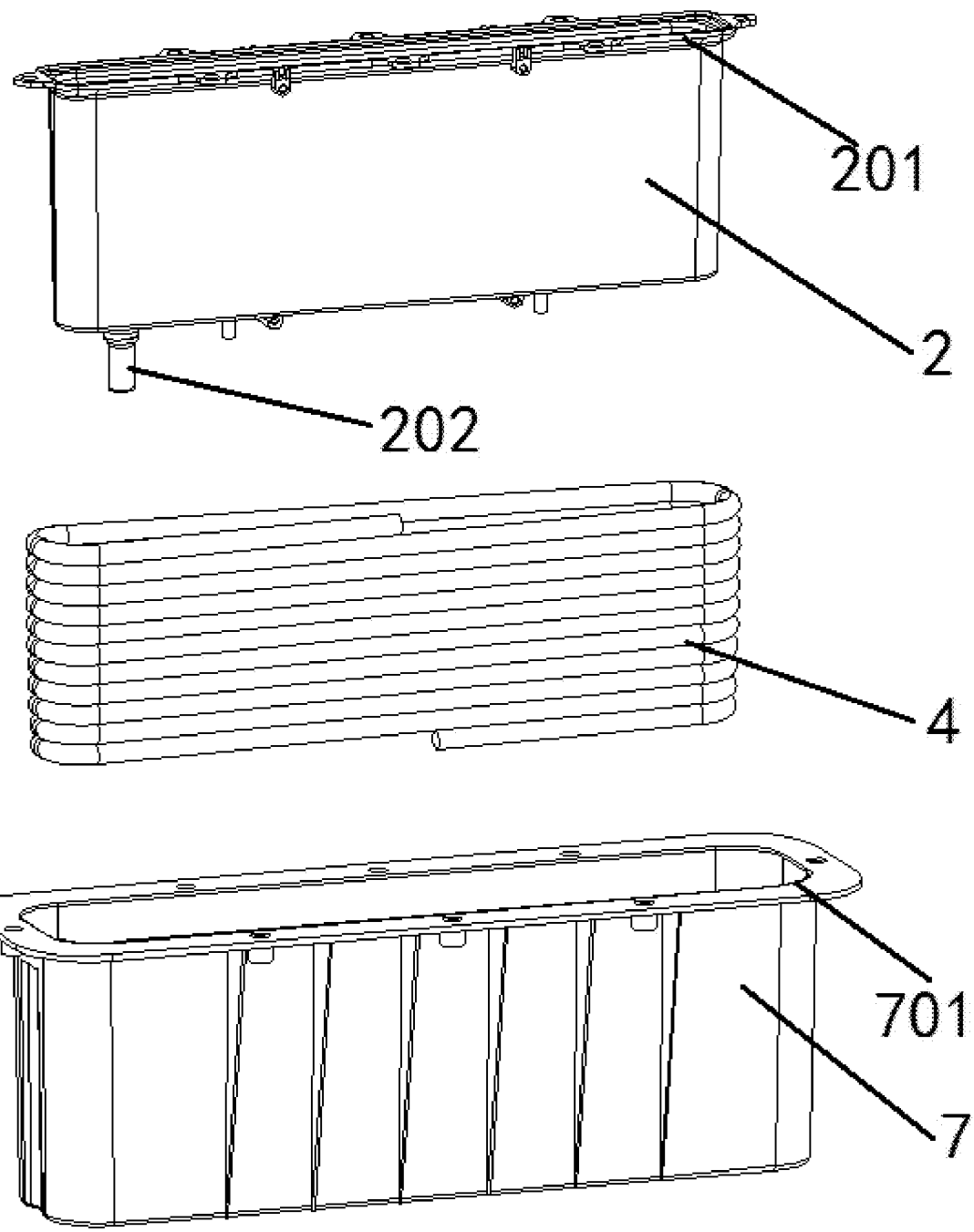
FIG. 4 is an enlarged view of a middle area of FIG. 1.
Figure 5:
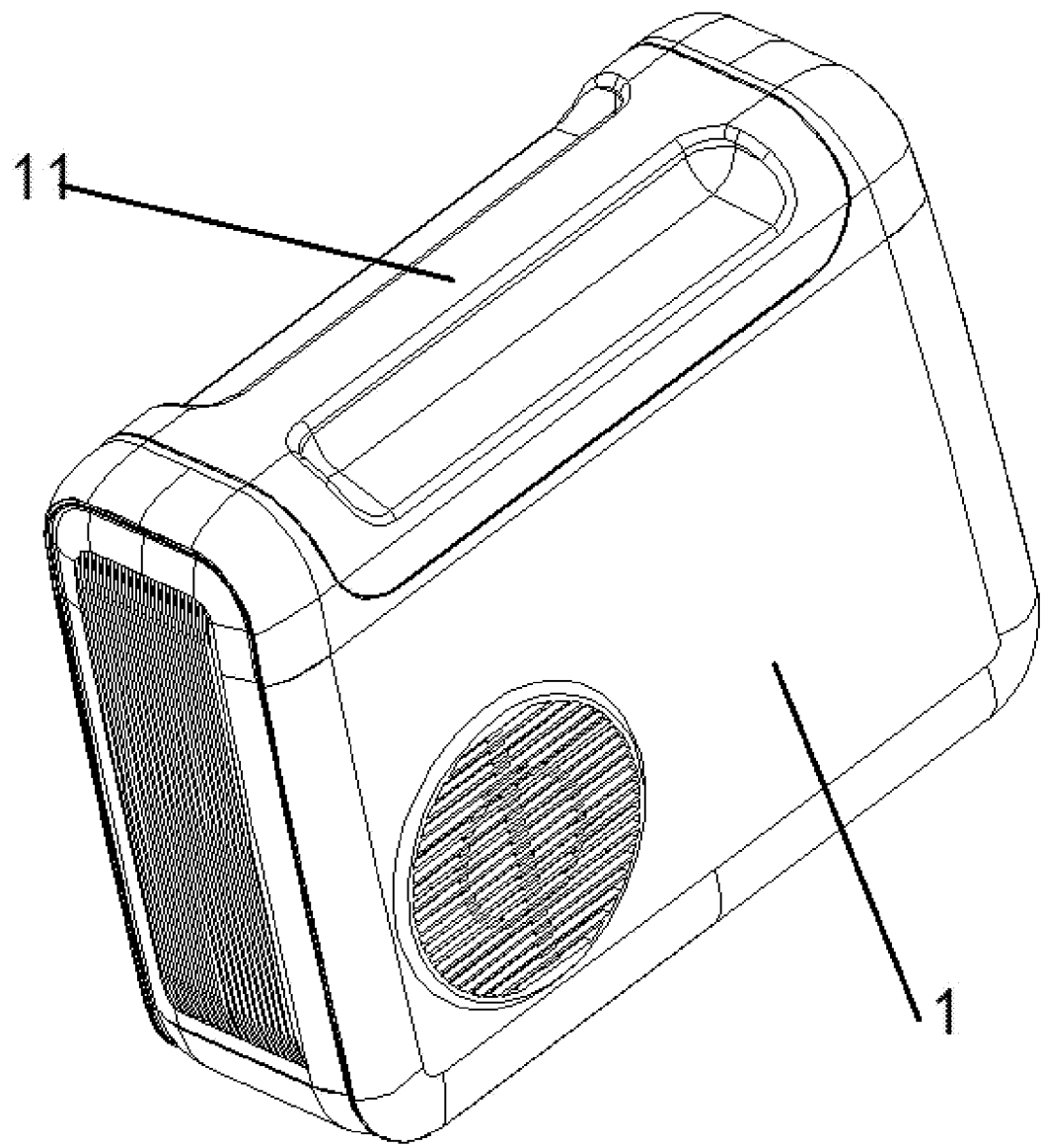
FIG. 5 is a perspective view of the present disclosure.
Figure 6:
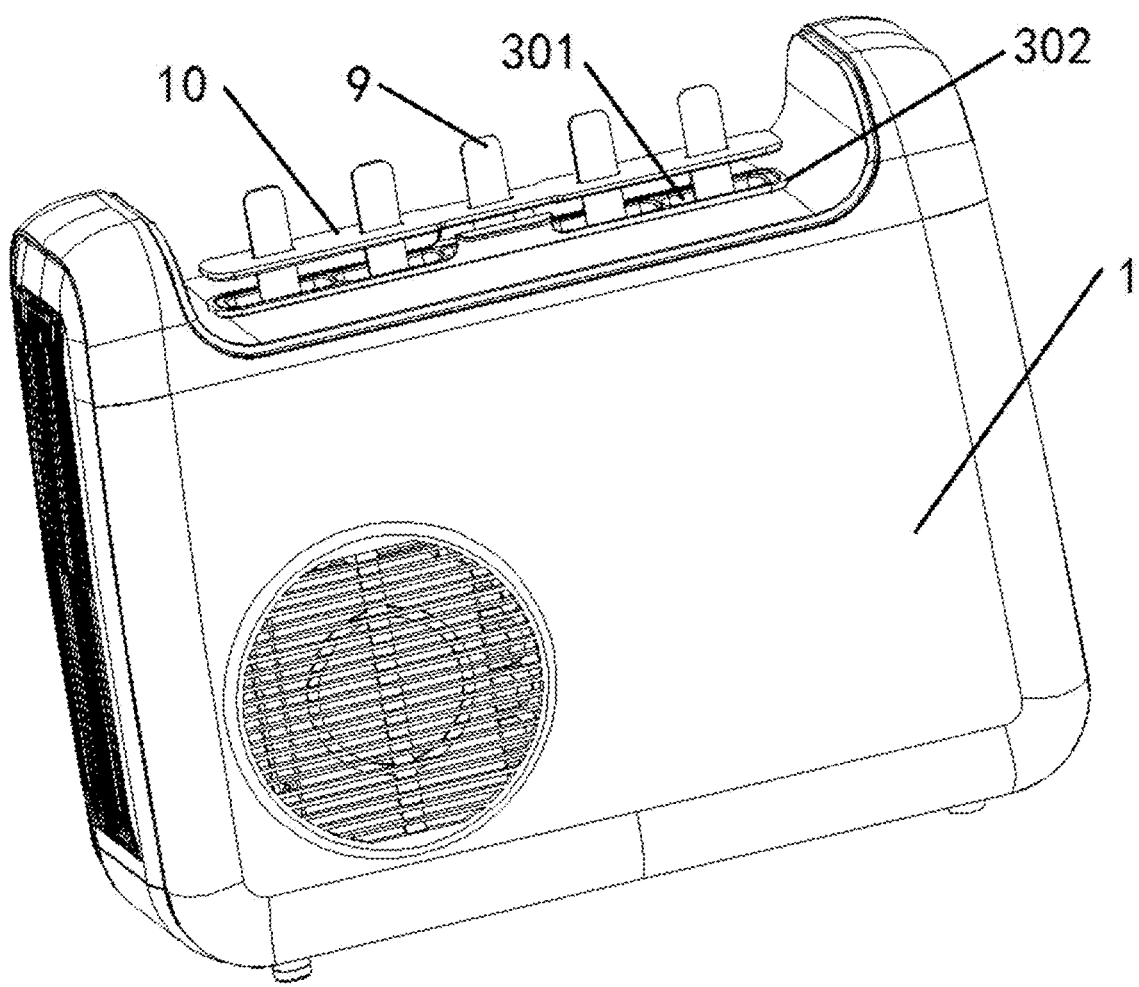
FIG. 6 is a perspective view of the present disclosure with an upper cover being removed.
Figure 7:
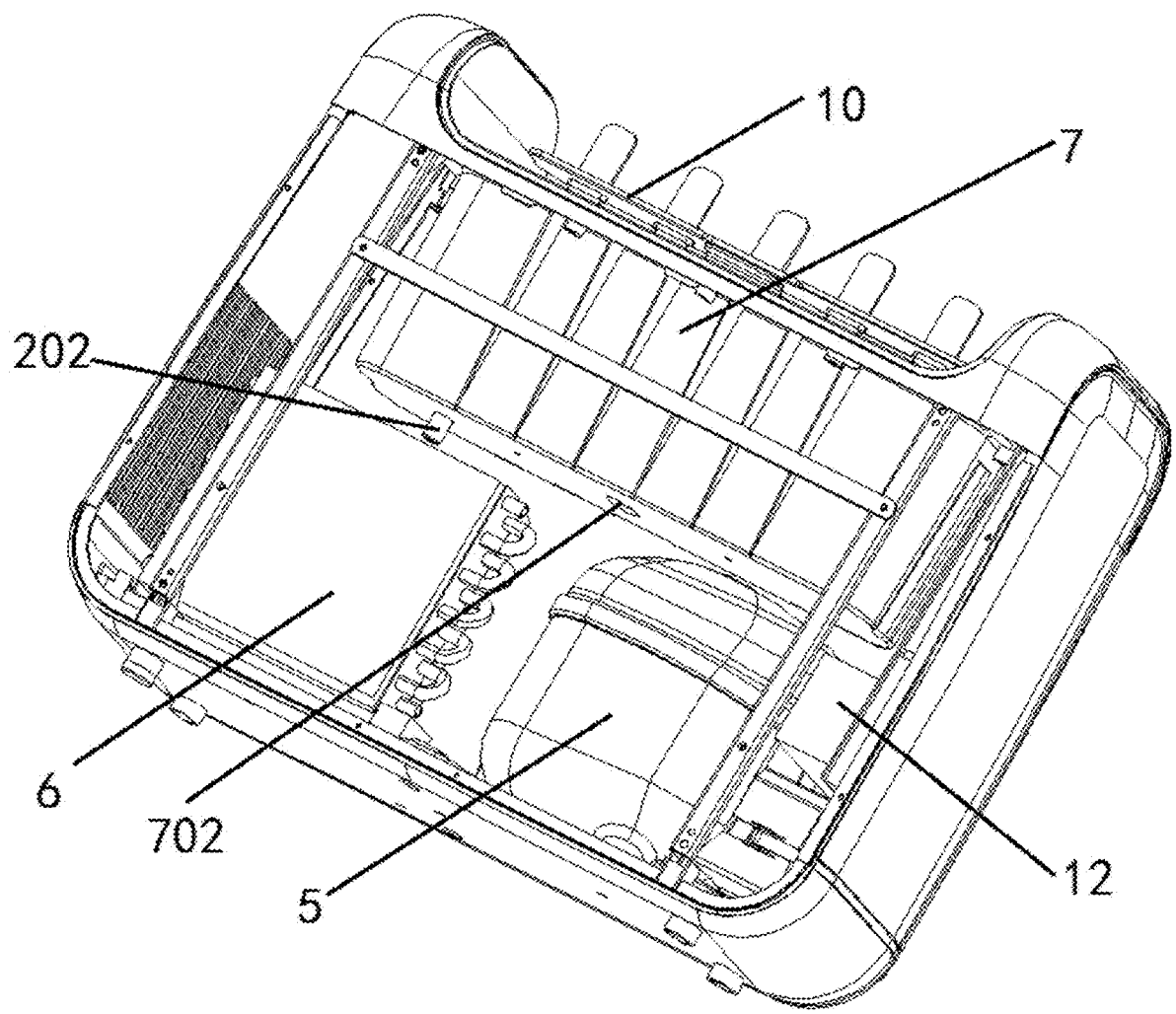
FIG. 7 is a perspective view of the present disclosure with a left cover plate and a right cover plate being removed.
Figure 8:
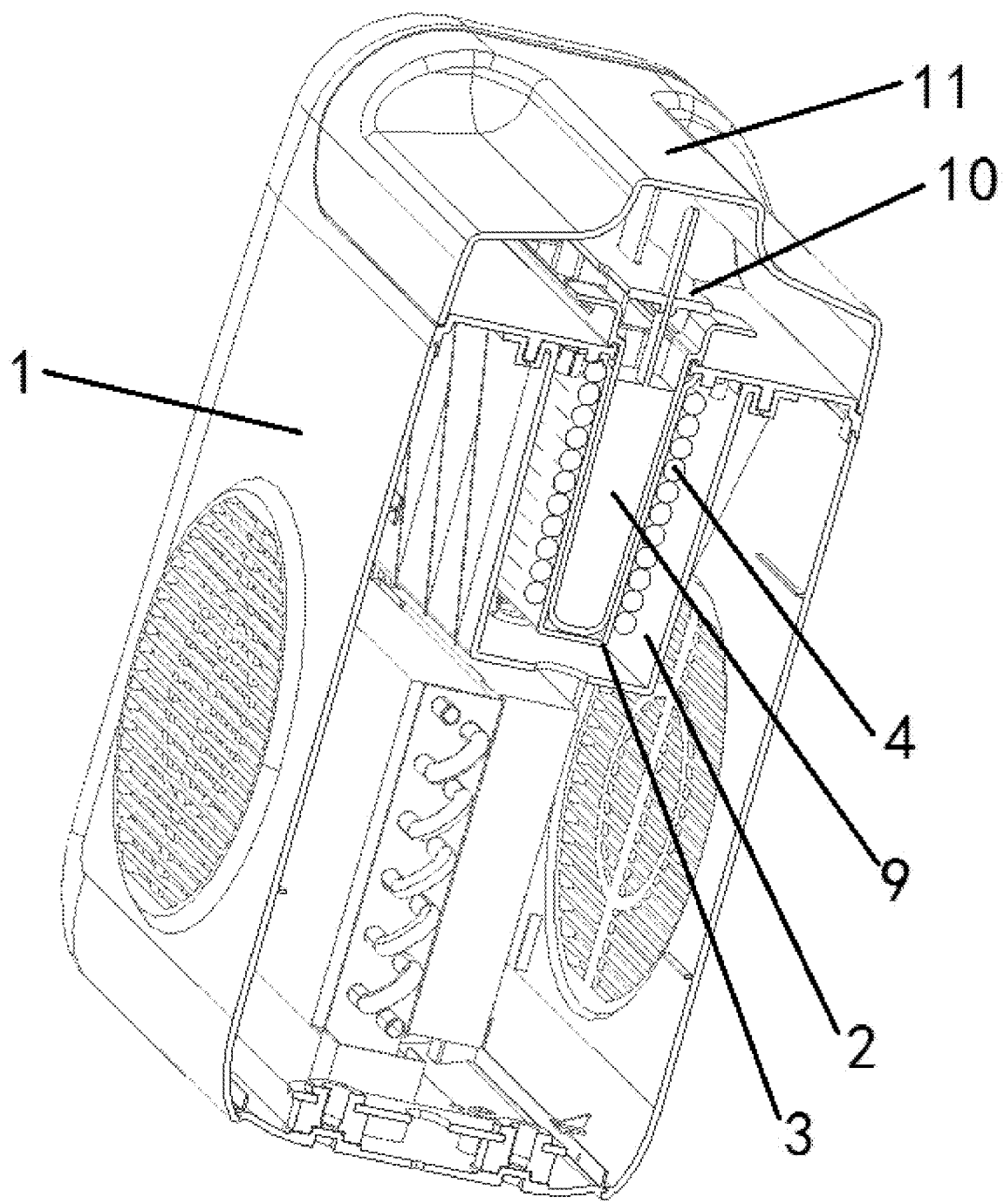
FIG. 8 is a cross-sectional view of the present disclosure.

In the present disclosure, for a clearer description, some explanations are made as follows. When an observer faces FIG. 1, the left side is designated as the back, the right side as the front, the front as the left, the back as the right, the top as above, and the bottom as below. It should be noted that terms "front end", "rear end", "left side", "right side", "middle", "above", "below" and other indications of orientations or position relationships in the text are not intended to have absolute orientations but are instead intended to describe relative positions of various components with respect to each other. In addition, the terms "first", "second", "third", and "fourth" are simply intended to distinguish one item from another, and is not intended to require a sequential order or quantity unless otherwise specified.

Referring to FIGS. 1 to 8, the embodiments of the present disclosure provide an ice cream machine, including a housing 1. An outer frame 2 is provided inside the housing 1, a sidewall of the housing 1 is defined with a first opening 107, a sidewall of the outer frame 2 is defined with a second opening 201, and the second opening 201 is in communication with the first opening 107. An inner frame 3 is provided inside the outer frame 2, and the inner frame 3 is detachable from the outer frame 2 through the second opening 201 and the first opening 107. An evaporation tube 4, a compressor 5, and a condenser 6 are provided inside the housing 1. The evaporation tube 4 is wound around the outer frame 2. The evaporation tube 4 is connected to the compressor 5 and the condenser 6. The working principle is as follows. The outer frame 2 is provided inside the housing 1, the sidewall of the housing 1 is defined with the first opening 107, the sidewall of the outer frame 2 is defined with the second opening 201, and the second opening 201 is in communication with the first opening 107. The inner frame 3 is provided inside the outer frame 2, and the inner frame 3 can be removed from the outer frame 3 through the second opening 201 and the first opening 107. The ice cream machine allows a user to replace inner frames of different shapes, thereby making various kinds of frozen foods, such as ice cream, cold drinks, wine, chocolate, ice cream of different sizes and styles, etc. The evaporation tube 4, the compressor 5, and the condenser 6 are also provided inside the housing 1. The evaporation tube 4 is wound around the outer frame 2, and the evaporation tube 4 is connected to the compressor 5 and the condenser 6. Thus, a refrigeration system is formed by combining the compressor 5, the condenser 6, the evaporation tube 4, and the outer frame 2. From the above description, it is clear that the ice cream machine of the present disclosure enables users to replace the inner frames with different shapes. This allows for the preparation of various types of frozen foods, such as ice cream, cold drinks, wine, chocolate, ice cream in different sizes, thereby providing convenience for users.

In some embodiments, a thermal insulation cover 7 is also provided inside the housing 1, and the thermal insulation cover 7 covers the outer frame 2, and the compressor 5 and the condenser 6 are located outside the thermal insulation cover 7. The setting of the thermal insulation cover 7 makes it possible to better maintain the temperature inside the thermal insulation cover 7, so as to prevent the outer frame from heating up too quickly after refrigeration.

In some embodiments, a sidewall of the thermal insulation cover 7 is provided with a third opening 701, and an edge of the third opening 701 is screwed to an edge of the first opening 107. the outer frame 2 can be separated from the thermal insulation cover 7 from the third opening 701. The screw connection and the setting of the third opening 701 facilitate the installation and removal of the thermal insulation cover 7.

In some embodiments, a through hole 702 is provided on a side of the thermal insulation cover 7 proximal to the compressor 5 and the condenser 6. One end of the evaporation tube 4 is connected to one end of the compressor 5 through a metal tube 8, and another end of the compressor 5 is connected to one end of the condenser 6 through the metal tube 8. Another end of the condenser 6 is connected to another end of the evaporation tube 4 through the metal tube 8. The through hole 702 allows the metal tube 8 to pass through. The refrigeration system includes the compressor, the condenser, the metal tube, the evaporation tube, and the outer frame. Its cooling principle operates similarly to that of a standard ice maker. Since this refrigeration mechanism employs conventional technology, which will be refrained from being elaborated.

In some embodiments, the edge of the second opening 201 is screwed to be fixed to the edge of the first opening 107. A drainage port 202 is provided on one side of the outer frame 2 away from the second opening 201. The drainage port 202 passes through a sidewall of the thermal insulation cover 7. The screw mounted connection enables convenient installation and removal of the outer frame 2 while providing internal drainage functionality for the outer frame 2.

In some embodiments, the compressor 5 and the condenser 6 are located below the thermal insulation cover 7, and the compressor 5 and the condenser 6 are distributed along a front-to-rear direction, and a length of the first opening 107 extends along the front-to-rear direction. In this way, the space in the housing can be distributed more reasonably.

In some embodiments, the inner frame 3 is defined with a plurality of ice cream grooves 301, and notches of the ice cream grooves 301 passes through the second opening 201 and the first opening 107. The ice cream grooves 301 are configured to make ice cream 9. A silicone cover 10 is provided above the inner frame 3, and the silicone cover 10 can seal the notches of the plurality of ice cream grooves 301, as well as preventing cold air in the ice cream grooves 301 from leaking outward.

In some embodiments, a flange 302 is provided on an edge of one end of the inner frame 3, and this end of the inner frame 3 passes through the first opening 107 and are exposed outward. The flange 302 is engaged with the edge of the first opening 107 to restrain the inner frame 3 from entering the outer frame 2. The flange 302 serves as a positive stop for the inner frame 3 during installation into the outer frame 2, while simultaneously facilitating removal of the inner frame 3.

In some embodiments, the housing 1 includes an upper retention cap 101, a base 102, a left cover plate 103, a right cover plate 104, a display panel 105, and a rear cover plate 106, which are distributed along up-to-down, left-to-right, and front-to-rear directions, respectively. An inner wall of the display panel 105 is connected with a control panel 12, and the control panel 12 is electrically connected to the compressor 5. The control panel 12 can control the operation of the compressor 5 and display it through the display panel 105.

In some embodiments, the first opening 107 is located on the upper retention cap 101. The upper cover 11 is provided above the upper retention cap 101 for covering the first opening 107 and the inner frame 3, thereby protecting the inner frame 3.

The above are some embodiments of the present disclosure. It should be noted that, for a person of ordinary skill in the art, the improvements and modifications can be made without departing from the principle of the present disclosure. These improvements and modifications are also considered to be within the protection scope of the present disclosure.

What is claimed is:

1. An ice cream machine, comprising a housing, wherein an outer frame is disposed inside the housing, a sidewall of the housing is defined with a first opening, a sidewall of the outer frame is defined with a second opening, an inner frame is provided inside the outer frame, and the inner frame is detachable from the outer frame through the second opening and the first opening; an evaporation tube, a compressor, and a condenser are provided inside the housing: the evaporation tube is wound around the outer frame, and the evaporation tube is connected to the compressor and the condenser; and
a thermal insulation cover is further provided inside the housing, one side of the thermal insulation cover facing the compressor and the condenser is defined with a through hole, one end of the evaporation tube is connected to one end of the compressor through a metal tube, another end of the compressor is connected to one end of the condenser through another metal tube, and another end of the condenser is connected to another end of the evaporation tube through a third metal tube, and the through hole allows the metal tube to pass through.

2. The ice cream machine according to claim 1, wherein the thermal insulation cover covers the outer frame, and the compressor and the condenser are located outside the thermal insulation cover.

3. The ice cream machine according to claim 2, wherein a sidewall of the thermal insulation cover is defined with a third opening, an edge of the third opening is screwed to an edge of the first opening, and the outer frame is removable from the thermal insulation cover from the third opening.

4. An ice cream machine, comprising a housing, wherein an outer frame is disposed inside the housing, a sidewall of the housing is defined with a first opening, a sidewall of the outer frame is defined with a second opening, an inner frame is provided inside the outer frame, and the inner frame is detachable from the outer frame through the second opening and the first opening; an evaporation tube, a compressor, and a condenser are provided inside the housing; the evaporation tube is wound around the outer frame, and the evaporation tube is connected to the compressor and the condenser;
a thermal insulation cover is further provided inside the housing; and
wherein an edge of the second opening is screwed to the edge of the first opening, and a drainage port is provided on a side of the outer frame away from the second opening, and the drainage port passes through a sidewall of the thermal insulation cover.

5. The ice cream machine according to claim 2, wherein the compressor and the condenser are located below the thermal insulation cover, the compressor and the condenser are distributed laterally, and the first opening extends laterally.

6. An ice cream machine,
wherein an outer frame is disposed inside a housing, a sidewall of the housing is defined with a first opening, a sidewall of the outer frame is defined with a second opening, an inner frame is provided inside the outer frame, and the inner frame is detachable from the outer frame through the second opening and the first opening; an evaporation tube, a compressor, and a condenser are provided inside the housing; the evaporation tube is wound around the outer frame, and the evaporation tube is connected to the compressor and the condenser; and
wherein a plurality of ice cream grooves are provided inside the inner frame, the plurality of ice cream grooves pass through the second opening and the first opening, the plurality of ice cream grooves are configured to make ice cream, a silicone cover is provided above the inner frame, and the silicone cover is configured to seal the plurality of ice cream grooves.

7. The ice cream machine according to claim 2, wherein a plurality of ice cream grooves are provided inside the inner frame, the plurality of ice cream grooves pass through the second opening and the first opening, the plurality of ice cream grooves are configured to make ice cream, a silicone cover is provided above the inner frame, and the silicone cover is configured to seal the plurality of ice cream grooves.

8. The ice cream machine according to claim 3, wherein a plurality of ice cream grooves are provided inside the inner frame, the plurality of ice cream grooves pass through the second opening and the first opening, the plurality of ice cream grooves are configured to make ice cream, a silicone cover is provided above the inner frame, and the silicone cover is configured to seal the plurality of ice cream grooves.

9. The ice cream machine according to claim 1, wherein a plurality of ice cream grooves are provided inside the inner frame, the plurality of ice cream grooves pass through the second opening and the first opening, the plurality of ice cream grooves are configured to make ice cream, a silicone cover is provided above the inner frame, and the silicone cover is configured to seal the plurality of ice cream grooves.

10. The ice cream machine according to claim 4, wherein a plurality of ice cream grooves are provided inside the inner frame, the plurality of ice cream grooves pass through the second opening and the first opening, the plurality of ice cream grooves are configured to make ice cream, a silicone cover is provided above the inner frame, and the silicone cover is configured to seal the plurality of ice cream grooves.

11. The ice cream machine according to claim 5, wherein a plurality of ice cream grooves are provided inside the inner frame, the plurality of ice cream grooves pass through the second opening and the first opening, the plurality of ice cream grooves are configured to make ice cream, a silicone cover is provided above the inner frame, and the silicone cover is configured to seal the plurality of ice cream grooves.

12. The ice cream machine according to claim 6, wherein a flange is provided on an edge of one end of the inner frame, and the flange forms is engaged with an edge of the first opening to retain the inner frame from sinking into of the outer frame.

13. The ice cream machine according to claim 1, wherein the housing comprises an upper retention cap, a base, a left cover, a right cover, a display panel, and a rear cover distributed along three orthogonal axes, and an inner wall of the display panel is connected to a control panel, and the control panel is electrically connected to the compressor.

14. The ice cream machine according to claim 2, wherein the housing comprises an upper retention cap, a base, a left cover, a right cover, a display panel, and a rear cover distributed along three orthogonal axes, and an inner wall of the display panel is connected to a control panel, and the control panel is electrically connected to the compressor.

15. The ice cream machine according to claim 3, wherein the housing comprises an upper retention cap, a base, a left cover, a right cover, a display panel, and a rear cover distributed along three orthogonal axes, and an inner wall of the display panel is connected to a control panel, and the control panel is electrically connected to the compressor.

16. The ice cream machine according to claim 6, wherein the housing comprises an upper retention cap, a base, a left cover, a right cover, a display panel, and a rear cover distributed along three orthogonal axes, and an inner wall of the display panel is connected to a control panel, and the control panel is electrically connected to the compressor.

17. The ice cream machine according to claim 4, wherein the housing comprises an upper retention cap, a base, a left cover, a right cover, a display panel, and a rear cover distributed along three orthogonal axes, and an inner wall of the display panel is connected to a control panel, and the control panel is electrically connected to the compressor.

18. The ice cream machine according to claim 5, wherein the housing comprises an upper retention cap, a base, a left cover, a right cover, a display panel, and a rear cover distributed along three orthogonal axes, and an inner wall of the display panel is connected to a control panel, and the control panel is electrically connected to the compressor.

19. The ice cream machine according to claim 13, wherein the upper retention cap is defined with the first opening, an upper cover is provided above the upper retention cap, and the upper cover is configured to cover the first opening and the inner frame.

* * * * *